Nov. 3, 1936.  W. L. HAMILTON  2,059,693
ELEVATED TRACK FOR MOTOR VEHICLES
Filed March 21, 1935  2 Sheets-Sheet 2
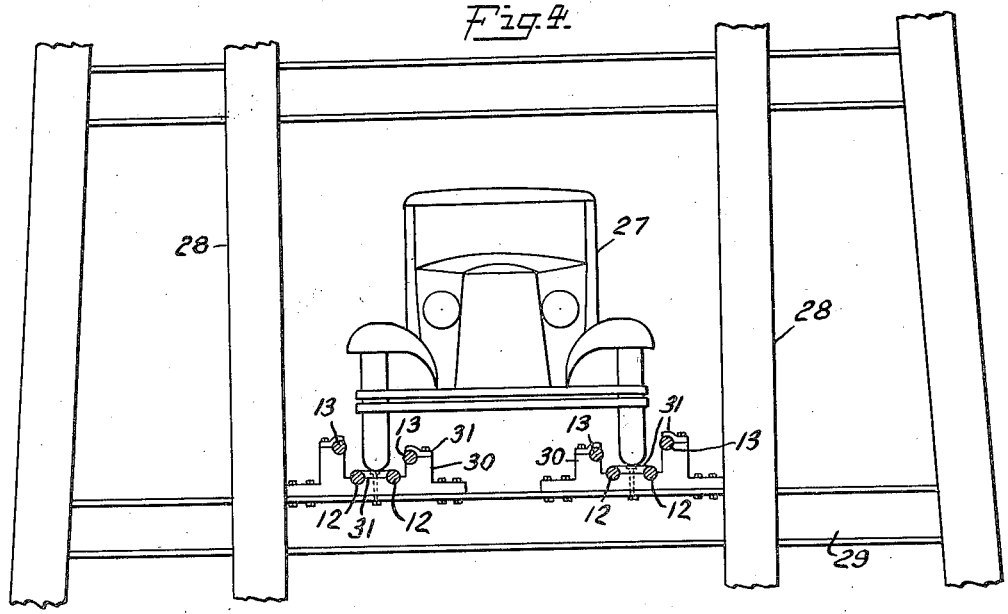
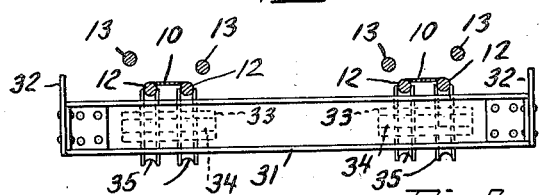
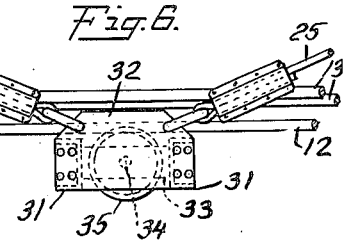
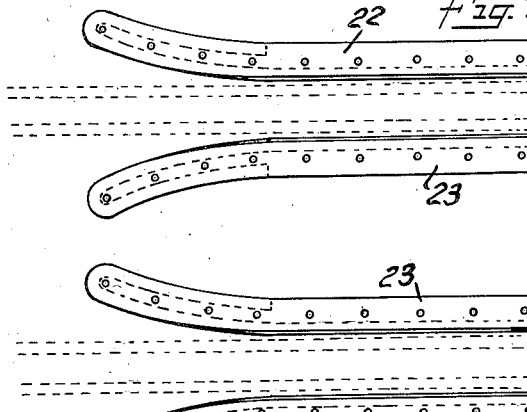
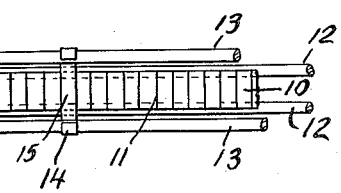
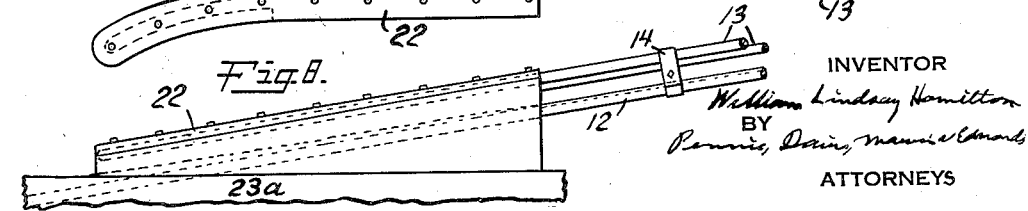
INVENTOR
William Lindsay Hamilton
BY
ATTORNEYS Patented Nov. 3, 1936

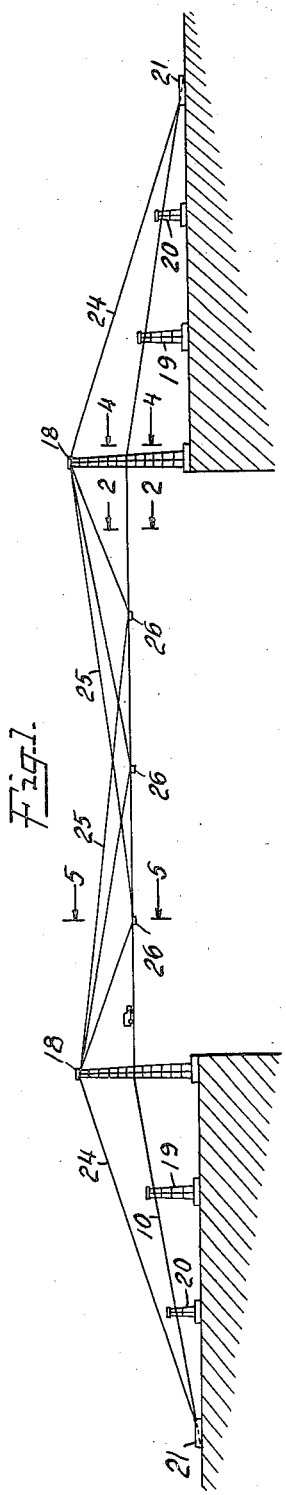
Nov. 3, 1936. W. L. HAMILTON 2,059,693
ELEVATED TRACK FOR MOTOR VEHICLES
Filed March 21, 1935 2 Sheets-Sheet 1

2,059,693

UNITED STATES PATENT OFFICE 2,059,693

ELEVATED TRACK FOR MOTOR VEHICLES

William Lindsay Hamilton, New York, N. Y.

Application March 21, 1935, Serial No. 12,195

15 Claims. (Cl. 104—123)

The object of my invention is to provide an elevated track for motor vehicles over a river, creek, ravine, railway or road, or wherever else it is desired to provide a track for motor vehicles which is elevated above the level of the solid ground.

By the use of my invention it is possible to construct such a track of proper and safe strength, of low weight, at low cost and with small delay.

In the drawings attached to this specification:

Fig. 1 is a side view of my improved elevated track.

Fig. 2 is a cross section on the line 2—2 of Figs. 1 and 3.

Fig. 3 is a longitudinal section on the line 3—3 of Fig. 2.

Fig. 4 is a view, partly in cross section, through the structure at one of the towers.

Fig. 5 is a view, partly in cross section on the line 5—5, of Fig. 1, showing details of the method of attachment of the tension members.

Fig. 6 is a side view of the arrangement shown in Fig. 5.

Fig. 7 is a plan view of the track at a point where it reaches the ground or permanent roadway.

Fig. 8 is a side elevation at the same point.

Referring first to Figs. 2 and 3, 10, 10 are horizontally-extending riding plates, each of which is capable of sustaining a wheel of a motor vehicle. The two plates 10, 10, are spaced apart, by means hereinafter to be described, a distance corresponding to the tread of an ordinary motor car, and are wide enough and are so spaced as to accommodate motor cars having such different treads as are in ordinary use. The plates 10, which will ordinarily be made of mild steel, are provided with a number of horizontal ribs 11, 11, Fig. 3, for added strength and to assist the traction.

The two plates 10 are separately carried in cradle-like structures as shown in Fig. 2, where 12, 12, are cables extending substantially parallel to each other, in a substantially horizontal plane, and lying side by side, and 13, 13, are another pair of cables, lying above the first pair, not necessarily in the same horizontal plane. All of these cables are carried on towers, with the help, unless the track is very short, of tension members, in a manner hereinafter to be described.

At suitable intervals in the length of the cableway, which intervals may for example be 6 feet, I provide a structure of stay straps 14, 15, bolted together by four bolts 16A, 16B, 16C, 16D, in such a manner as to determine the proper space relationship between the cables and to unite them into a single structure, so that each cable will take its share of the load.

As will be seen in Figs. 2 and 3, each riding plate 10 is supported throughout its whole length by the cables 12, 12. Each cable 12 is clamped between the upper or inside stay strap 15 and the lower or outside stay strap 14, which latter is bent around the cables.

At suitable intervals, which may be 48 feet, I provide also a second set of stay straps 17, which straps determine the space relationship between the two tracks and which are bolted to the cradle-like structure above referred to by the bolts 16A.

In Fig. 1, 18, 18, are the main towers and 19, 19, and 20, 20, are smaller towers, while 21, 21, are anchorages, shown more in detail in Figs. 7 and 8, from which latter figures it will be seen that the cables 12, 12, and 13, 13, pass at their ends into a series of clamping structures 22, 23, which structures also serve as guides for the wheels of motor vehicles entering the elevated track. The details of this anchoring structure will naturally be varied considerably, depending on the strain to which the cables are subjected. I have shown in Fig. 8 one set of cables as embedded in a mass of concrete, 23A, but as the methods of anchoring cables are well known in the art it is unnecessary to go into detail on this point.

Referring again to Fig. 1, it will be seen that the track 10 with its accompanying cables extends upwardly from the anchorage 21 to the towers 20, 19 and 18, and thus across the space to be spanned. In addition I show a series of tension members, 24, 24, preferably cables, which members connect the tops of the main towers 18, 18, with the anchorages 21, 21, respectively. I also show a number of supporting tension members 25, 25, which are carried in pairs from the tops of the towers 18, 18, each pair consisting of one cable attached to the top of one tower and another cable attached to the top of the other tower, the lower ends of these two cables being attached to the supporting cradle of the track at the same point, as for example at the point 26 in Fig. 1. This arrangement gives a longitudinal stability to the structure much greater than would be the case if the track were merely hung by vertical ties from a catenary suspended between the two towers.

The manner in which the cables rest on the towers is shown in Fig. 4, where 27 is a motor vehicle using the roadway, appearing between the members of the framework 28, 28, of the tower 18. To a cross-bar 29 of that framework are bolted members 30, 30, on which the cables 12, 12, and 13, 13 rest, and to which they may, if desired, be clamped, by the clamps 31. The clamps may be bolted in place as shown in Fig. 4.

Figs. 5 and 6 show a method for attaching the supporting tension members 25, 25, to the cables 13 and 12. At these points I interpose, at right angles to the track, channel bars 31 on which I bolt steel fish plates 32. To each fish plate I bolt or rivet a bearing plate 33. Between each fish plate and its bearing plate I run an axle 34 on which is mounted a sheaved pulley 35. The two cables 12, 12, which support the riding plates 10, lie in the sheaves of these pulleys.

The tension on the cables 12 and 13 is great enough so that with the help of the various supporting means described they are able to maintain themselves under the intended load, not of course in a mathematically straight line, but near enough to a straight line so that a motor vehicle may comfortably be driven over them. They are able to flex slightly under the load, as it varies from time to time, and the section of the riding plates is made such that while they are stiff enough to hold up the motor vehicles, they are flexible enough so that they can yield to conform to the position which the cables take in the normal use of the structure, and in doing so will not be exposed to any internal strains sufficient to bring about crystallization or other long-use deterioration; these strains in normal use should not exceed 25% of the elastic limit of the steel.

Each wheel of each motor vehicle using the track is guided and held in place by the upper set of cables 13, 13, as shown in Figs. 2 and 4, so that it is impossible for a motor vehicle to leave the track except at the end of the roadway.

In this manner I am able to provide a structure in which the ratio of weight of motor vehicle carried to total dead weight of the supported structure is unusually high; the result is that my improved elevated track weighs very much less than an elevated roadway of the ordinary bridge type of equal capacity would weigh and can therefore be supported by lighter and cheaper cables from lighter and cheaper towers.

The presence or absence of the additional towers 19, 20, and the number and strength of the supporting tension members 25 will of course vary, depending on the length of the span and other engineering conditions.

I claim:

1. An elevated track for motor vehicles comprising two separate riding plates, each capable of supporting a wheel of a motor vehicle, a plurality of cables separately supporting each of the plates, and means for preserving the proper space relation between the plates.

2. An elevated track for motor vehicles comprising two separate riding plates, a system of supporting cables for each plate, each plate with its associated cables being capable of supporting and guiding a wheel of a motor vehicle, with means for preserving the proper space relation between the two plates.

3. An elevated track for motor vehicles comprising two riding plates, two upper cables and two lower cables supporting each plate, and stay straps for maintaining the proper space relation between each set of four cables and between each set of cables and its corresponding plate, and between the plates.

4. An elevated track for motor vehicles comprising two separate riding plates, each capable of supporting a wheel of a motor vehicle and each separately supported by a plurality of cables, means for preserving the proper space relation between the two plates, means for supporting the cables, such latter means consisting of a plurality of pairs of tension members attached to the cables at various points where support is desired, and towers for supporting the tension members.

5. A suspended elevated track for motor vehicles comprising towers, abutments, tension members running from the towers to the abutments, a pair of riding plates, a set of cables for supporting each plate, spacing means for preserving the proper space relation between the plates, and tension members supporting the cables at intermediate points.

6. An elevated track for motor vehicles comprising two separate riding plates, each capable of supporting a wheel of a motor vehicle and each supported by cables, with means for preserving the proper space relation between the two plates, each riding plate being supported by two lower cables and two upper cables, the four cables being held in proper space relation at intervals in their length by stay straps; the upper cables being so located as to act as guiding means for the wheels of motor vehicles.

7. In an elevated track, a set of parallel cables, two of which are in substantially the same horizontal plane, stay mechanisms for preserving the proper space relation between the cables, means at intervals in the length of the cables for supporting them, and a riding plate directly supported through substantially its whole length by said two cables, said riding plate being thin enough to conform to any yielding movement of the cables.

8. A suspended elevated track for motor vehicles comprising towers, abutments, tension members running from the towers to the abutments, a pair of riding plates, a set of cables for supporting each plate, spacing means for preserving the proper space relation between the plates, a plurality of tension members each running from a tower to a point in one of the cables, whereby the cables are supported at intermediate points, the tension members including cables each running at an angle from the vertical, whereby said cables form a network adapted to give longitudinal stability to the structure.

9. In an elevated track, a set of parallel cables, two of which are in substantially the same horizontal plane, stay mechanisms for preserving the proper space relation between the cables, means at intervals in the length of the cables for supporting them, and a riding plate directly supported through substantially its whole length by said two cables, said riding plate being thin enough to conform to any yielding movement of the cables.

10. In an elevated track, a set of parallel cables, two of which are in substantially the same horizontal plane, stay mechanisms for preserving the proper space relation between the cables, means at intervals in the length of the cables for supporting them, and a riding plate directly supported through substantially its whole length by said two cables, the plate being so thin that its deformation in the normal use of the track is less than twenty-five percent of the deformation corresponding to its elastic limit.

11. A suspended elevated track for motor vehicles comprising towers, abutments, tension members running from the towers to the abutments, a pair of riding plates, a set of cables for supporting each plate, spacing means for preserving the proper space relationship between the plates, and tension members supporting the cables at intermediate points, the tension members being arranged in pairs, the two members of each pair being connected to the cables at substantially the same point, and running upwards, away from each other, at an angle to the vertical, to different points of support.

12. An elevated track for motor vehicles comprising at least one row of horizontally disposed riding plates, cables extending above said row of riding plates between spaced anchorage points, horizontal stay straps suspended from said cables, said stay straps spaced lengthwise of and extending transversely of said row of riding plates, said stay straps formed with open-topped channels beneath said riding plates, and cables accommodated in said channels and extending be- near said row of riding plates between spaced anchorage points and supporting said riding plates.

13. An elevated track for motor vehicles comprising at least one row of horizontally disposed riding plates, horizontal stay straps spaced lengthwise of and extending transversely of said row of riding plates and supporting said riding plates, said stay straps formed with open-topped channels beneath said riding plates, cables accommodated in said channels and extending beneath said row of riding plates between spaced anchorage points, upright arms at the end of said stay straps, said arms presenting channels extending above said row of riding plates, and cables accommodated in said last mentioned channels, said last mentioned cables extending between spaced anchorage points and sustaining said stay straps.

14. An elevated track for motor vehicles comprising at least one row of horizontally disposed riding plates, horizontal stay straps spaced lengthwise of and extending transversely of said row of riding plates, said riding plates clamped to said stay straps, said stay straps formed with open-topped channels beneath said riding plates, channel-forming parts at the ends of said stay straps extending above said row of riding plates, cables accommodated in said first mentioned channels beneath said row of riding plates, and cables accommodated in said last mentioned channels and sustaining said stay straps, each of said cables extending between spaced anchorage points beyond the ends of said row of riding plates.

15. An elevated track for motor vehicles comprising at least one continuous row of horizontally disposed riding plates, ribbed in the direction transverse to the track, horizontal stay straps spaced lengthwise of and extending transversely of said row of riding plates and supporting said riding plates from below, said stay straps formed with open-topped channels, parallel cables accommodated in said channels and extending beneath said row of riding plates between spaced anchorage points, uprights at the ends of said stay straps, said uprights presenting channels extending above said row of riding plates, and cables accommodated in said last mentioned channels, said last mentioned cables extending between spaced anchorage points and sustaining said stay straps, said last mentioned cables forming parapets.

WILLIAM LINDSAY HAMILTON.